(No Model.) 3 Sheets—Sheet 2.
J. B. PURVIS.
AUTOMATIC OILER.
No. 367,444. Patented Aug. 2, 1887.
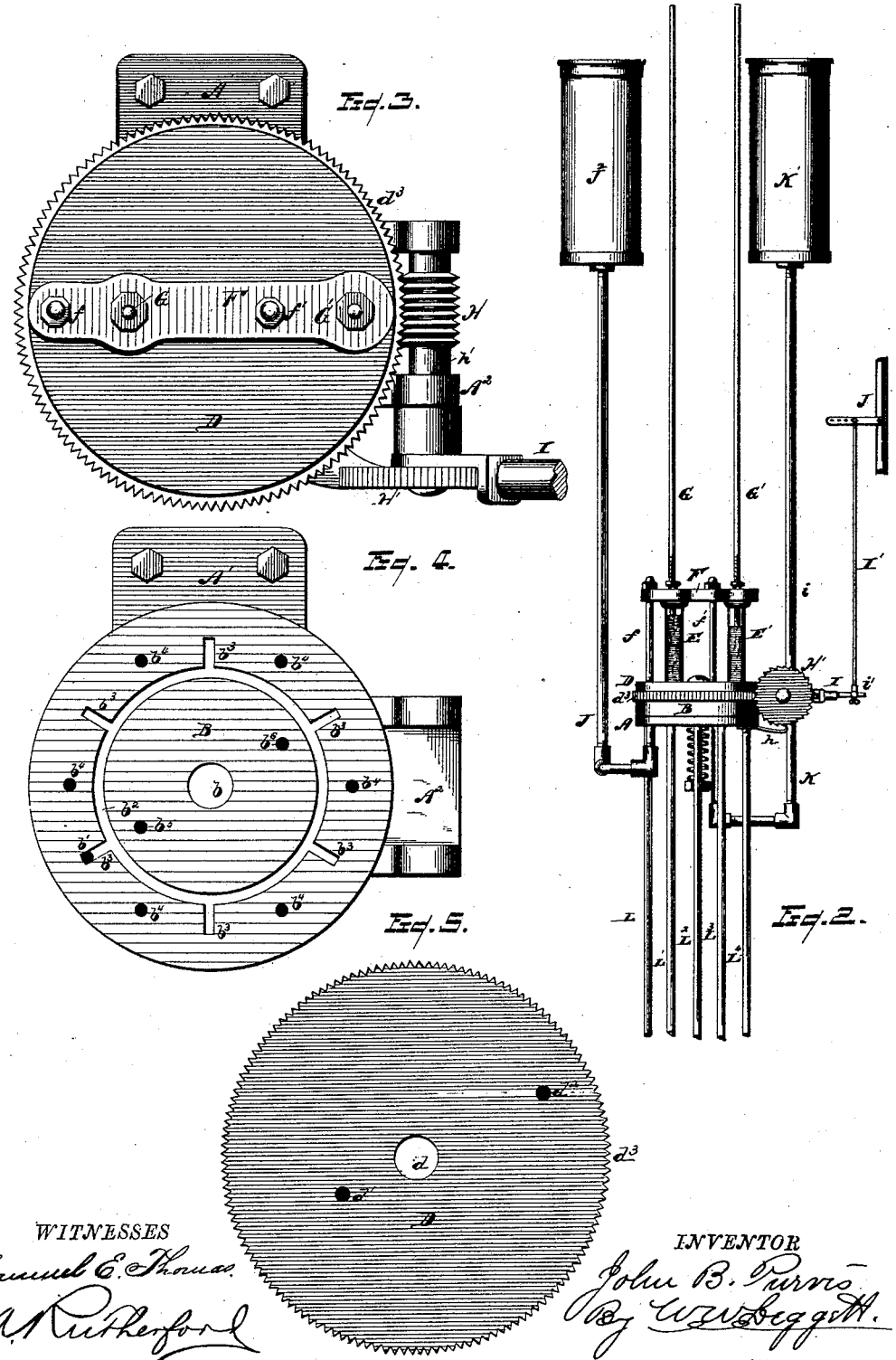
WITNESSES
Samuel E. Thomas
J. A. Rutherford
INVENTOR
John B. Purvis
By W. W. Leggett
Attorney

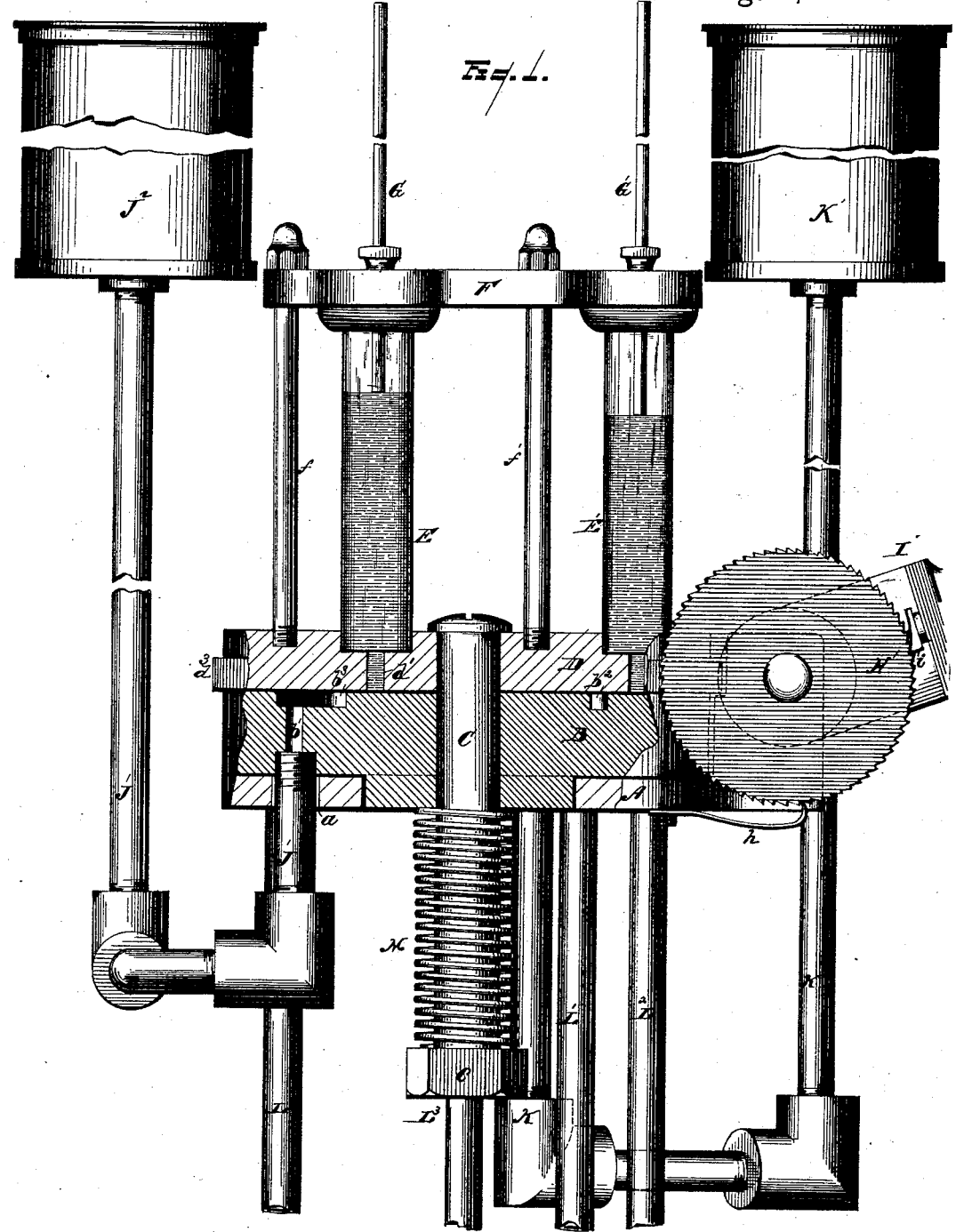

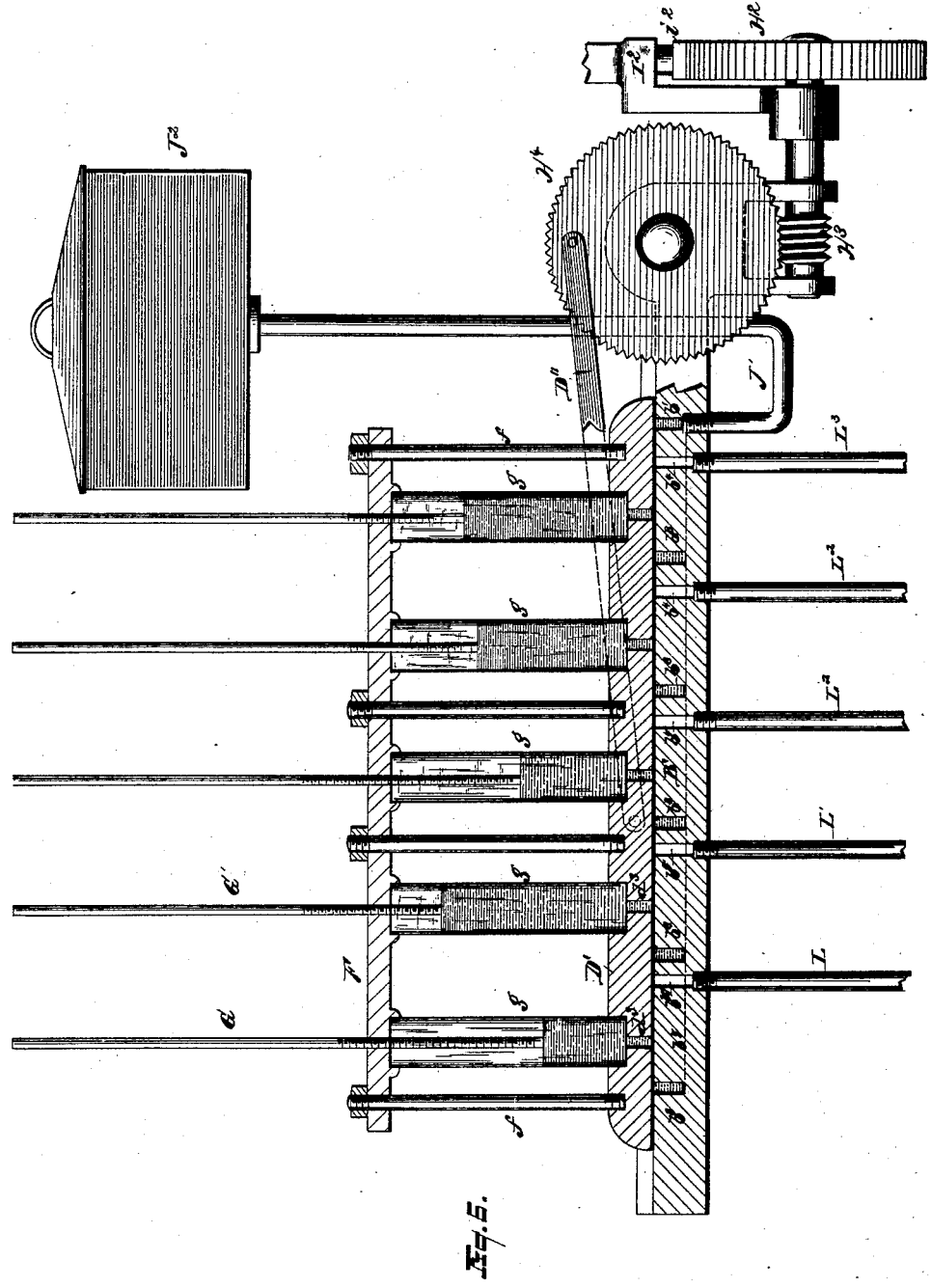

UNITED STATES PATENT OFFICE.

JOHN B. PURVIS, OF DETROIT, MICHIGAN.

AUTOMATIC OILER.

SPECIFICATION forming part of Letters Patent No. 367,444, dated August 2, 1887.

Application filed December 28, 1886. Serial No. 222,822. (No model.)

*To all whom it may concern:*

Be it known that I, JOHN B. PURVIS, of Detroit, county of Wayne, State of Michigan, have invented a new and useful Improvement in Automatic Oilers; and I declare the following to be a full, clear, and exact description of the same, such as will enable others skilled in the art to which it pertains to make and use it, reference being had to the accompanying drawings, which form a part of this specification.

My invention has for its object the construction of an improved automatic oiler for steam-engines and various other machinery to which it may be found adapted—such as electric dynamos, &c.; and it consists of the combinations of devices and appliances hereinafter specified, and more particularly pointed out in the claims.

Heretofore much of the oiling of various parts of engines and other machinery has been done by the hand of the engineer or attendant, necessarily requiring careful attention if the work is done properly, and rendering much injury liable to occur when the machinery is left in careless or inexperienced hands. This process of oiling, moreover, has been found to require a very considerable amount of oil, the amount fed to the various parts being without any proper regulation or uniformity. My invention, however, contemplates an oiler which shall work automatically, and which may be regulated to feed any desired amount of oil to any part of the machinery at any desired intervals of time, thus insuring a positive and constant oiling of the parts with precision and uniformity, and relieving the engineer or attendant of all care in this respect, and permitting the amount of oil fed to be so regulated as to secure very great economy in the amount of oil used.

I carry out my invention as follows:

In the drawings, Figure 1 is a vertical section of a device embodying my invention, showing parts in elevation. Fig. 2 is a side elevation of the same; Fig. 3, a plan view; Fig. 4, a plan view of the bed-plate; Fig. 5, an inverted plan of the rotary plate. Fig. 6 is a vertical section illustrating a modification of my invention.

A represents a supporting-plate, of any suitable construction, arranged to be firmly secured to any support—as, for instance, by means of a perforated arm, A', whereby it may be bolted upon said support. This plate is constructed with any desired number of orifices to receive the inlet and feeding pipes, as shown, for instance, in Fig. 1 at $a$.

B is a bed-plate constructed with a central orifice to receive a binding-bolt, C, as shown at $b$, Fig. 4. It is also perforated with any desired number of orifices communicating with the inlet and feeding pipes. I do not limit myself to any particular arrangement or construction of these orifices in said plate, as they may be of any number and desired order of construction and location. I have illustrated said bed-plate as provided with a supply-orifice, $b'$, communicating with an annular channel, $b^2$, said channel provided with a series of radiating feeding ports or grooves, $b^3$, of any desired number, the construction being such that oil fed through the supply-orifice $b'$ may have free passage throughout said annular channel $b^2$ and into the ports or grooves $b^3$, one of said ports communicating with said supply-pipe $b'$. Thus the oil may be fed through a single inlet to all the various feeding-ports. These feeding-ports extend toward the periphery of the bed-plate B in the accompanying drawings. Arranged in a circle coincident with said ports are located a series of feeding-orifices, $b^4$. The said plate is also provided with an additional supply-orifice, $b^5$, and a corresponding feeding-orifice, $b^6$, said orifice arranged in a coincident circle.

D is a rotary plate located upon the plate B, said plate provided with a central binding-bolt orifice, $d$, and also, as shown in the drawings, with supply-orifices $d'$ $d^2$, said orifices communicating, respectively, with feeding-chambers E E'. These chambers are preferably made of glass, so that the amount of oil fed through each may be visible at all times. They may, however, be made of any desired material. They may be held in engagement with the rotary plate in any proper manner—as, for instance, by means of a guard-arm, F, engaged upon their upper ends, said arm united with said rotary plate by bolts $f f'$.

G G' represent air-tubes communicating with the interior of said chambers E E'. The plate D may be made rotatable in any desired manner—as, for instance, its exterior may be constructed with a gear, as shown at $d^3$, meshing with a worm, H, which may conveniently be mounted upon an arm, $A^2$, of the supporting-plate A. The worm is provided with a ratchet-wheel, H'.

$h$ is a pawl in connection with said ratchet to prevent any backward movement of the worm-gear. Sleeved upon the shaft $h'$ of the worm-gear H is an operating-lever, I, provided with a dog or pawl, $i$, having a suitable engagement with said lever, so that it may ride freely over the ratchet-plate when the lever is moved in a corresponding direction, and yet will engage the ratchet-tooth when the lever is moved in the direction to rotate the worm-gear. This lever may be engaged by an intervening pitman, I', with any reciprocatory part of the engine or other machinery—for instance, as shown in the drawings—with the valve-stem J. It will thus be seen that as the valve-stem or other reciprocatory part of the engine moves in either direction the lever I will be automatically operated, and in consequence a rotary movement be given to the plate D through the intervening worm-gear, H, the rotation of the plate D corresponding to the movement of said reciprocatory part of the engine, the connection therewith being made adjustable—as shown, for instance, at $i'$, Fig. 2—or otherwise, so that any desired degree of rotation may be given to throw the rotary plate at each movement of said reciprocatory part.

J' represents a supply-pipe communicating with the supply-orifice $b'$ of the plate B, and thence through the feeding parts $b^3$ with the annular channel $b^2$.

$J^2$ is an oil-reservoir communicating with said supply-pipe.

K represents an additional supply-pipe engaged with the plate B at the base of the orifice $b^5$.

K' is an oil-reservoir engaged therewith. L L' $L^2$ $L^3$ $L^4$ represent a series of feeding pipes or tubes, which may extend from the base of the feeding-orifices $b^4$ in the plate B and to which they are attached to various parts of the engine to be oiled. I have shown in the drawings two oil-reservoirs with their supply-pipes J' and K, and two feeding-chambers, E E', corresponding thereto. I would have it understood, however, that my invention contemplates the use of one or more oil-reservoirs, one or more feeding-pipes, and one or more feeding-chambers arranged to communicate at intervals with the supply-pipes and with any desired number of feeding-tubes, as with such a device, made in conformity with my invention, I contemplate the use of various kinds of oil, if desired, supplied from separate tanks through the bed-plate B to any desired number of feeding-chambers, and thence to any desired number of feeding-tubes. It may be convenient to so arrange one of the feeding-chambers and its connections, as shown in the drawings, so that its contents may be directed entirely to the oiling of the crank-pin alone. Thus, as shown, the supply-pipe K will feed oil from the reservoir K' through the orifice $b^5$ and into the chamber E, when its orifice $d'$ is coincident with the orifice $b^5$ in the rotation of the plate D, a free channel at the time of this coincidence being provided from the reservoir K' to the chamber E.

When the chamber E has been filled, the supply is immediately cut off by the rotation of the plate D; but when the orifice $d'$ is brought into position coincident with the orifice $b^6$ the contents of the chamber E will be immediately discharged into the feeding-pipe communicating with said orifice $b^6$, and thence fed to the part to be lubricated, the oil-reservoirs being carried to a height sufficient to insure the feeding of the oil to the respective parts of the engine when free passage is open from the feeding-chamber thereto.

It will be observed that I have illustrated the feeding-chamber E as arranged to communicate with only a single feeding-tube through the orifice $d'$, so that, if desired, its contents may be, as above mentioned, directed solely to the lubrication of the crank-pin, as said pin needs more constant lubrication than other parts. In like manner it will be seen that oil is communicated from the reservoir $J^2$ through the orifice $b'$ and into the annular channel $b^2$ and its radiating-ports $b^3$, so that whenever the orifice $d^2$, communicating with the chamber E', is brought into coincidence with any one of said feeding-ports in the rotation of the plate D the chamber E' will be filled. The supply of oil is cut off by the rotation of said plate, and remains in the chamber until its orifice $d^2$ is brought into coincidence with any feeding-orifice $b^4$, said feeding-ports and feeding-orifices being arranged alternately in a circle in the plate B. By constructing said plate with any desired number of feeding-ports and feeding-pipes the oil may be carried regularly to as many parts of the engines as it is desired to lubricate.

The air-tubes G G' have an adjustable engagement with the chambers E E', so that the supply of oil to said chambers may be regulated, as may be desired, by the adjustment of the respective air-tubes. Said air-tubes should rise to the same height as the oil-reservoirs. By adjusting said tubes farther into their respective chambers it is evident that a less amount of oil can be fed thereto, as the air above the oil at the top of said chambers will limit the amount of oil which will be supplied thereto, the oil rising in said chambers to close the lower end of the air-tubes, and its ingress will be checked at that point. This affords a very simple means of adjustment for regulating the amount of oil to be fed to any given part of the engine, and the use of valves is entirely dispensed with in the construction of my improved automatic oiler.

The rotatable plate D and bed-plate B are held in position upon the supporting-plate A by the binding-bolt C, said bolt provided with a spring, M, for holding the plates D and B firmly together. The tension of the spring may be regulated by a nut, c, upon said bolt.

The plates B and D may be held upon the supporting-plate A by recessing the interior of the plate A and constructing the plate B with an annular shoulder or hub to engage in said recess, as shown in Fig. 1.

It will be seen that the device is adapted to lubricate those parts of the engine where there is no steam-pressure to be overcome. Various oils may be used without any liability of their communicating with each other.

By constructing the bed-plate with the annular channel and radial ports a large number of feeding-pipes can be fed from a single feeding-chamber, but by using a corresponding number of feeding-chambers to correspond with the number of ports illustrated in the drawings, the bed-plate might be perforated at these points, the annular channel being dispensed with, said perforations communicating each directly with a separate feeding-chamber upon the rotation of the plate.

The supporting-plate A and bed-plate B might be made of a single integral piece without departing from the principle of my invention. I have, however, found it more convenient in the process of manufacture to make them separate.

I have shown in the first figures of the drawings the plates B and D made annular, and have described the plate D as having a rotary movement to bring its orifices successively into coincidence with the supply and feeding orifices of the plate B. It is obvious, however, that the plate D need not have a rotary movement alone to accomplish this purpose, as it may be made to reciprocate to bring its orifices into coincidence with the orifices of the plate B, as desired, and I have shown such a construction in Fig. 6. The principle and operation are identically the same, the plate D' simply having a longitudinal instead of a rotary movement. In this case a similar ratchet mechanism is provided to that already described, consisting of a wheel, $H^2$, and ratchet $i^2$, which is also operated by a lever, $I^2$, engaged with any reciprocatory part of the mechanism. Instead, however, of the worm-gear being connected with a geared periphery of the plate D, in this instance the worm-wheel $H^3$ is engaged with an intermediate gear, $H^4$, connected with the plate D' by a rod, D'', the rod D'' eccentrically engaged with the gear $H^4$ at one end, and with the plate D' at its opposite end, to give a reciprocatory movement to said plate upon the rotation of said worm-wheel $H^4$ through the worm $H^3$. So, also, instead of providing the plate B with an annular channel, $b^2$, said channel would extend longitudinally on the surface of the bed-plate B', as shown by dotted lines, Fig. 6, at $b^7$, and be provided with inwardly-extended grooves $b^8$, serving the same function as the radial parts $b^3$. (Illustrated in Fig. 4.)

When the plate D' is made reciprocatory, it should be provided with a series of receiving-chambers, as shown at $g$.

The inlet-pipes leading from one or more oil-tanks would communicate through the plate B', in the same manner as that already described—viz., with the channel $b^7$, thence to the grooves $b^8$ communicating therewith. It will thus be seen that as the plate D' is reciprocated the receiving or feeding chambers $g$ will be filled when their orifices, opening through the said plate, as indicated at $b^3$, are coincident with the grooves $b^8$; and when said orifices are coincident with the feeding-orifices $b^{10}$ said chambers will discharge their oil through the pipes L L', &c., to the parts to be lubricated. While I would have it understood that I contemplate any movement of the plate D to bring its orifice into coincidence with the inlet and outlet orifice of the bed-plate as coming within the scope of my invention, I prefer to make the plate D rotatable, as thereby the number of oil-chambers to be filled from the oil-tanks may be diminished where a number of parts are to be lubricated. This device is obviously simple and economical in construction. There are no parts likely to get out of order, and consequently it is found efficient in its operation. The parts to be lubricated will be regularly oiled, with a very great saving in the quantity of oil used. Experience has demonstrated that with this device the engine can be lubricated with no more than one-fifth of the quantity of oil ordinarily employed.

What I claim is—

1. In an oiler, the combination, with a bed provided with supply and feeding orifices, of a movable perforated plate provided with one or more oil-chambers having adjustable air-tubes engaged therewith, the construction being such that said chambers may be brought into coincidence with said supply and feeding orifices and communicate alternately therewith upon the movement of said plate, substantially as and in the manner described.

2. In an oiler, the combination, with a bed provided with supply and feeding orifices, of a movable perforated plate provided with one or more oil-chambers, and ratchet mechanism for operating said movable plate and bringing its perforations alternately into coincidence with said corresponding supply and feeding orifices, said ratchet mechanism provided with a reciprocating operating-lever, I, substantially as described.

3. In an oiler, the combination, with a bed having a series of supply and feeding pipes connected therewith, of a movable perforated plate provided with one or more oil-chambers, said bed constructed with a feeding-channel, $b^2$, provided with a series of ports, $b^3$, substantially as and for the purposes described.

4. In an oiler, a bed provided with supply and feeding orifices, and constructed with a supply-channel provided with a series of ports, $b^3$, said ports and orifices arranged alternately in a line with each other, substantially as described.

5. In an oiler, the combination, with a bed provided with separate different series of supply and feeding orifices, of a movable perforated plate provided with two or more oil-chambers, each of said series of supply and feeding orifices communicating with separate oil-chambers upon the movement of said plate, the construction being such that separate oils may be fed to and from said chambers, substantially as and for the purpose described.

6. In an oiler, the combination, with a bed provided with feeding pipes leading to various parts to be lubricated, and with one or more supply-pipes leading from supply-tanks, and communicating through said bed, of a movable perforated plate provided with one or more oil-chambers, the construction being such that the oil may be admitted to said chambers from said tanks, and be discharged from said chambers through said feeding-pipes upon the movement of said plate, substantially as described.

7. The combination, with a bed provided with separate supply and feeding orifices passing through said bed, of a rotatable perforated plate provided with one or more oil-chambers, arranged to communicate alternately with their respective supply and feed orifices, substantially as and in the manner described.

8. In an oiler, the combination, with a bed provided with supply and feeding orifices, of a rotatable perforated plate provided with one or more oil-chambers, and ratchet mechanism to rotate said plate and bring its perforations alternately into coincidence with the corresponding supply and feeding orifices, substantially as described.

9. In an oiler, the combination, with a bed provided with supply and feeding orifices, of a rotatable perforated plate provided with one or more oil-chambers, said plate toothed upon its periphery, and a worm-gear meshing with said toothed periphery to rotate said plate and bring its perforations alternately into coincidence with the corresponding supply and feeding orifices, substantially as described.

10. In an oiler, the combination, with a bed provided with supply and feeding orifices, of a perforated plate provided with one or more oil-chambers, said plate toothed upon its periphery, a worm-gear meshing with said toothed periphery, and a ratchet mechanism to operate said worm-gear and bring the perforations of said plate alternately into coincidence with their corresponding supply and feeding orifices, substantially as described.

11. In a machine-oiler, the combination, with a bed provided with supply and feeding orifices, of a rotatable perforated plate provided with one or more oil-chambers, ratchet mechanism to operate said plate, and a reciprocatory lever to operate said ratchet mechanism and bring the perforations of said plate alternately into coincidence with their corresponding supply and feeding orifices, substantially as described.

12. The combination, with a bed provided with separate supply and feeding orifices passing through said bed, of a rotatable perforated plate provided with one or more oil-chambers, said bed and said plate held in engagement by a binding bolt, substantially as described.

13. The combination, with a bed provided with supply and feeding orifices, of a rotatable perforated plate provided with one or more oil-chambers, said bed and said plate provided with one or more oil-chambers, said bed and said plate held in engagement by a binding-bolt and tension-spring, substantially as described.

14. In an oiler, the combination, with the bed provided with separate supply and feeding orifices passing through said bed, of a movable perforated plate provided with one or more oil-chambers, having air-tubes engaged therewith, the construction being such that said chambers may be brought into successive coincidence with said supply and feeding orifices, and communicate alternately therewith upon the movement of said bed, substantially as and in the manner described.

15. In an oiler, the combination, with a bed provided with separate supply and feeding orifices passing through said bed, of a movable perforated plate provided with one or more oil-chambers, and mechanism to engage said movable plate and bring its perforations into coincidence with the corresponding separate supply and feeding orifices in said bed, substantially as described.

16. In an oiler, the combination, with a movable perforated plate provided with one or more sight-feed oil-chambers connected therewith, of supply and feeding pipes communicating through said bed, substantially as described.

17. In an oiler, the combination, with a bed provided with one or more supply and feeding pipes passing through said bed and leading from and to their respective oil-tanks and parts to be lubricated, of a movable perforated plate provided with one or more oil-chambers, the construction being such that when the perforations of said plate are coincident with the supply-orifices of said bed a feed of oil will be communicated to said chambers, and when the perforations of said plate are coincident with the feeding-orifices of said bed said feed of oil will be delivered from said chambers into said feeding-pipes, said chambers being alternately supplied and emptied upon the movement of said plate, substantially as described.

18. In an oiler, the combination, with a bed provided with separate supply and feeding orifices passing through said bed, of a movable oil-feeding chamber, the construction being such that said chamber may be brought alternately into coincidence with said supply and feeding orifices, substantially as described.

19. In an oiler, the combination, with separate supply and feeding pipes passing through said bed, of one or more movable oil-feeding chambers, the construction being such that said chambers may be brought alternately into coincidence with said supply and feeding pipes, substantially as described.

In testimony whereof I sign this specification in the presence of two witnesses.

JOHN B. PURVIS.

Witnesses:
N. S. WRIGHT,
M. B. O'DOGHERTY.